United States Patent [19]

de Kok et al.

[11] 4,323,339

[45] Apr. 6, 1982

[54] DEVICE FOR MANUFACTURING PLASTICS PIPES WITH OBLONG CHANNELS

[75] Inventors: Johan de Kok, Hardenberg; Jan P. van Dongeren, Bergentheim, both of Netherlands

[73] Assignee: Wavin B.V., Zwolle, Netherlands

[21] Appl. No.: 147,391

[22] Filed: May 7, 1980

Related U.S. Application Data

[62] Division of Ser. No. 648,755, Jan. 13, 1976, abandoned.

[30] Foreign Application Priority Data

Jan. 13, 1975 [NL] Netherlands .......................... 7500386

[51] Int. Cl.³ ............................................. B29D 23/04
[52] U.S. Cl. .................................. 425/199; 264/209.8; 425/380; 425/466; 425/467
[58] Field of Search ................................ 425/380–381, 425/466–467, 197–199, 465; 264/173, 177 R, 209, 209.8

[56] References Cited

U.S. PATENT DOCUMENTS

| | | | |
|---|---|---|---|
| 2,551,710 | 5/1951 | Slaughter | 264/209 |
| 3,117,342 | 1/1964 | Koppehele | 264/177 R |
| 3,266,092 | 8/1966 | Corbett | 264/209 |
| 3,273,202 | 9/1966 | Zygan | 264/177 R |
| 3,274,315 | 9/1966 | Kawamura | 264/177 R |
| 3,372,920 | 3/1968 | Corbett et al. | 264/177 R |
| 3,668,288 | 6/1972 | Takahashi | 264/209 |
| 3,714,310 | 1/1973 | Gaffney et al. | 264/209 |
| 3,815,637 | 6/1974 | Carrow | 264/177 R |
| 3,978,182 | 8/1976 | Luthra | 264/210.1 |

FOREIGN PATENT DOCUMENTS

| | | | |
|---|---|---|---|
| 1577201 | 8/1969 | France | 425/467 |
| 40-17142 | 8/1965 | Japan | 425/467 |
| 46-19554 | 6/1971 | Japan | 264/177 R |

*Primary Examiner*—Jeffery R. Thurlow
*Attorney, Agent, or Firm*—Wigman & Cohen

[57] ABSTRACT

An apparatus for forming a plastic pipe having a circular cross-section and elongated longitudinal channels in the pipe wall is disclosed. A mass of synthetic plastic material is pressed through an annular space defined by inner and outer annular supports, the annular space having a plurality of spaced pin supports concentrically disposed therein and regulating the quantity of material flow through the annular space, depending on the shape of the pin supports, by selectively moving the walls of the annular supports closer to each other. In a particularly advantageous embodiment, either the wall of the inner annular support or the wall of the outer annular support, or both, are moved closer to each other in the area between adjacent pin supports.

4 Claims, 4 Drawing Figures

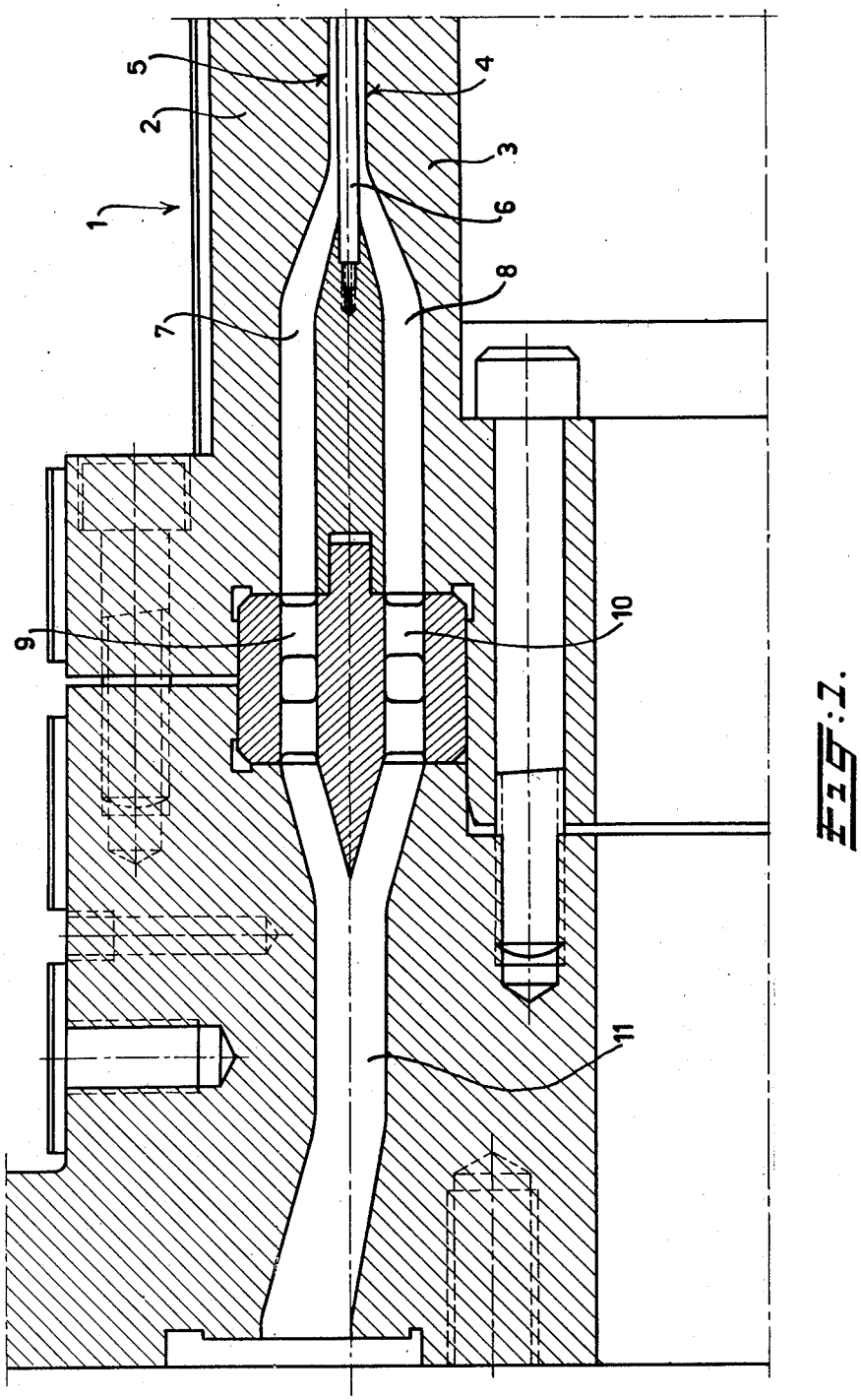

DEVICE FOR MANUFACTURING PLASTICS PIPES WITH OBLONG CHANNELS

This is a division of application Ser. No. 648,755, filed Jan. 13, 1976 now abandoned.

BACKGROUND OF THE INVENTION

The invention relates to a method of manufacturing a plastics pipe, with a circular cross section, comprising an outer pipe and an inner pipe, which is concentrically arranged with respect to the outer pipe, and petitions extending in the longitudinal direction of the pipe and connecting the outer pipe with the inner pipe, by pressing a mass of synthetic material through a space, delimited by an outer and an inner annular support, in which pin-shaped supports are disposed in spaced relationship from each other, which are adapted to the cross section of elongated channels to be formed in the wall of the plastics pipe.

Such a method of manufacturing plastics pipes with a circular cross section, comprising an outer pipe and an inner pipe which is concentrical thereto and partitions extending in the longitudinal direction of the pipe is known.

This method in which an extruder with an annular mouthpiece, with pins for the formation of the channels, is used, has the drawback that in manufacturing a plastics pipe in which between the inner and outer wall of the pipe are a row of channels with a circular cross section, longitudinal ridges are formed, also called: corrugations. These longitudinal ridges or corrugations make the pipes unfit for various purposes, while moreover the strength properties of such pipes leave much to be desired.

On the other hand, however, plastics pipes with only one row of elongated channels between the inner- and outer wall are in great demand. Contrary to pipes with more concentric rows of annular channels between the inner- and outer wall less material is required for obtaining the same rigidity, whereas another advantage is a decreased buckling length and a simpler output.

SUMMARY AND OBJECTS OF THE INVENTION

The invention aims to provide a method of manufacturing such synthetic pipes which do not present the aforementioned disadvantages.

Thereto pipes are provided with an outer and an inner annular support, and between these, a row of concentric pin-shaped supports. Thus the quantity of plastics material which has to pass the space, delimited by two adjacent pin-shaped supports and the inner and outer one, is regulated depending on the shape of the pin-shaped supports.

In this manner plastics pipes can be manufactured with, a row of annular elongated channels with a circular cross section between their inner- and outer wall. Neither the inner- nor the outer wall of such a pipe is corrugated or provided with longitudinal ridges.

The regulation of the quantity of synthetic material to be passed is conveniently effected by moving the outer and inner annular support nearer to each other.

A further advantage of moving the outer and inner annular support towards each other is in that a gradual flow is efficiently produced along these parts and the regions on either side thereof.

At last it is advisable to use pin-shaped supports with an annular cross section for producing the present pipes while we think it likewise advisable to lead the flow of material for the formation of such plastics pipes at some distance before the pin-shaped support in two concentric flows which are united again prior to the moment at which they issue from the space formed by the annular outer and inner support.

The latter feature enables formation of plastics pipes of the desired cross section with elongated channels having the desired cross sections as well.

The invention in a second aspect relates to plastics pipes produced by means of the method as described hereinbefore.

The invention in a third aspect relates to a device for performing the method as described above for manufacturing a plastics pipe, with a circular cross section, comprising an outer- and inner pipe, concentrically relative to the outer pipe, and longitudinal partitions connecting the outer pipe with the inner pipe. This device comprises an extruder with an annular mouth piece, delimited by a core and a casing and pins in this space having a cross section which is adapted to the cross section of the channels to be formed, this device being provided with means regulating the passage of plastics material, situated between the outer wall of the core and the inner wall of the casing in the area between two adjacent pins, one row of pins being mounted, concentrically relative to core and casing.

In a particularly convenient embodiment, the distance between the outer core wall and the inner casing wall in the area between two adjacent pins is smaller than the corresponding distance in the area near a pin.

The inner casing wall or the outer core wall are provided with corrugatged ridges in the area between two consecutive pins, since these ridges impart the best circular configuration to the plastics pipe to be manufactured.

The device is also efficiently provided with members for dividing the plastics material supplied, into two flows concentric with respect to each other, which flows are united again before the end of the annular mouth piece.

The invention is hereinafter clarified with reference to the drawing in which an embodiment is shown.

BRIEF DESCRIPTION OF THE DRAWINGS

In the drawing:

FIG. 1 is a longitudinal section through a part of an extruder with an annular mouth piece, according to the invention.

DETAILED DESCRIPTION OF A PREFERRED EMBODIMENT

Figures 3, 4:
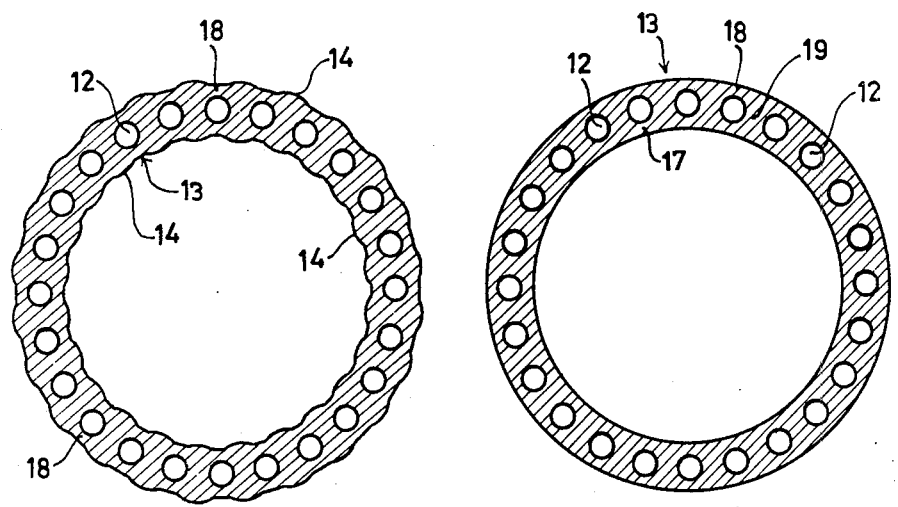
FIG. 3 is a cross section through a pipe manufactured without using the invention.
FIG. 4 is a cross section through a pipe manufactured according to the invention.
Figure 2:
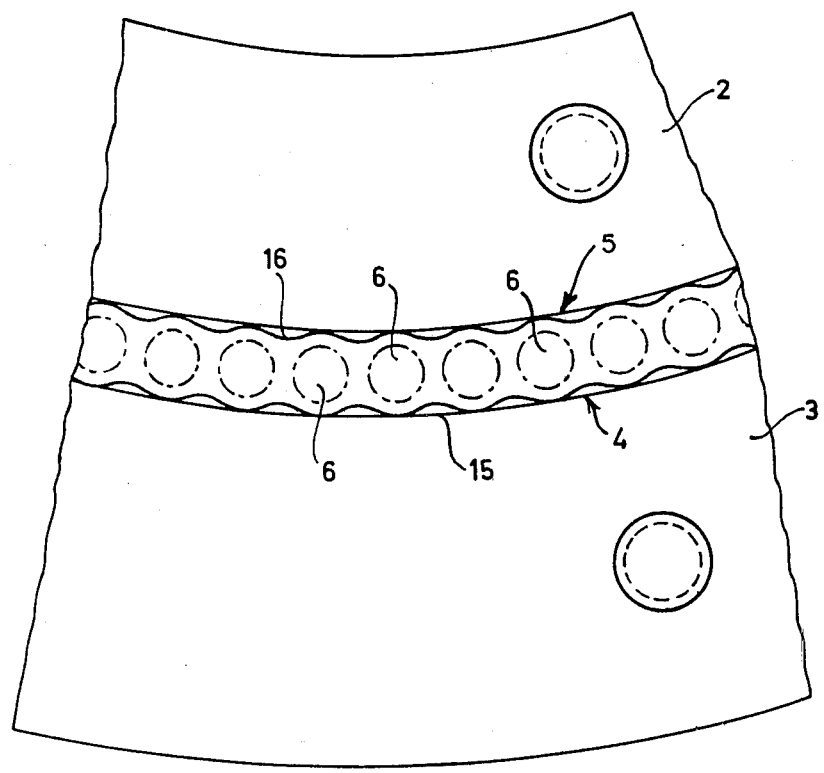
FIG. 2 is a view of an annular mouth piece of such an extruder.

The drawing shows part of the extruder with an annular mouth piece 1, delimited by a core 2 and a casing 3, while in the space formed by the inner wall 4 of the casing and the outer wall 5 of the core 2 pins 6 with a cylindrical cross section are disposed.

These pins 6 constitute a single row of pins which is concentric relative to the core 2 and the casing 3.

The annular mouth piece is also provided with two concentrical feed channels 7 and 8 for the plastics material. In the channel 7 a first crusher plate 9 is accommodated; in channel 8 a second crusher plate 10. The supply of the plastics material is effected via annular feed channel 11.

When plastics pipes 13 (see FIG. 3) are produced by means of such a device, longitudinal ridges or corrugations 14 are formed inside pipes 13 between two adjacent channels 12 in the wall of the pipes. These corrugations impair the properties of the produced plastics pipe. The pipe 13 with longitudinally extending pipe wall channels 12 consists essentially of an inner pipe 17 and an outer pipe 18 which are interconnected by partitions.

It is an object of the invention to prevent the formation of these corrugations which may also be present on the outer side of the plastics pipe 13.

It is now proposed to regulate the quantity of plastics material which has to pass the space delimited by the inner wall 4 of the casing and the outer wall 5 of the core 2 and between two adjacent pins 6 in dependence of the shape, that is to say the cross sectional shape, of the pins 6. For that purpose the device is provided with means, regulating the passage of plastics material, in the shape of heightened wall parts 15 on the inner wall 4 of the casing and/or heightened wall parts 16 on the outer wall of the core 2.

These undulatory heightened wall parts 15 and 16 extend in a longitudinal direction on the outer wall of the core and/or on the inner wall of the casing.

It has been found that in this way plastics pipes can be obtained with a cross section as shown in FIG. 4 which is entirely or almost entirely without longitudinal ridges.

The plastics pipes are manufactured of thermoplastics, like polyvinylchloride.

We claim:

1. A device for performing the manufacturing of plastic pipes, comprising:
   an extruder with an annular mouth piece, being defined by a core and a casing with a plurality of adjacent pins in an annular space, being defined by an outer wall of the core and an inner wall of the casing, said annular space having a cross section which is adapted to a cross section of channels to be formed,
   means for regulating the passage of synthetic material being provided between the outer wall of the core and the inner wall of the casing in an area between two of the plurality of adjacent pins,
   one row of said plurality of adjacent pins being concentrically situated relative to the core and the casing;
   wherein at least one of the inner wall of the casing and the outer wall of the core is provided with corrugated ridges in the area between two adjacent pins; and
   whereby the formation of longitudinally extending deformations in the plastic pipes being manufactured is substantially avoided.

2. A device according to claim 1, wherein the distance between the outer wall of the core and the inner wall of the casing in the area between two adjacent pins is smaller than the corresponding distance between the outer wall of the core and the inner wall of the casing in an area across a single pin.

3. A device according to claim 1 or 2, further comprising:
   two concentrically extending channels adjoining a feed channel for said synthetic material, and a crusher plate being arranged in each of said two concentrically extending channels while said two concentrically extending channels are united at a distance from an end of the annular mouth piece.

4. A device according to claim 1 or 2, wherein the adjacent pins have cylindrical cross sections.

* * * * *